US005684084A

United States Patent [19]

Lewin et al.

[11] Patent Number: 5,684,084
[45] Date of Patent: Nov. 4, 1997

[54] COATING CONTAINING ACRYLOSILANE POLYMER TO IMPROVE MAR AND ACID ETCH RESISTANCE

[75] Inventors: Laura Ann Lewin, Greenville, Del.; Gary Warren Nickel, Sewell, N.J.

[73] Assignee: E. I. Du Pont de Nemours and Company, Wilmington, Del.

[21] Appl. No.: 576,711

[22] Filed: Dec. 21, 1995

[51] Int. Cl.$^6$ .................. C08J 3/00; C08K 5/00; C08L 75/00; C08L 83/00
[52] U.S. Cl. .................. 524/590; 428/423.1; 428/447; 428/500; 524/539; 524/588; 524/589; 525/101; 525/123; 525/455; 528/28
[58] Field of Search .................. 528/28; 525/101, 525/123, 455; 524/590, 588, 589, 539; 428/423.1, 447, 500

[56] References Cited

U.S. PATENT DOCUMENTS

| | | | |
|---|---|---|---|
| 3,839,242 | 10/1974 | Huber et al. | 260/2.5 AH |
| 4,093,673 | 6/1978 | Chang et al. | 260/824 EP |
| 4,291,135 | 9/1981 | Höhlein | 525/101 |
| 4,499,150 | 2/1985 | Dowbenko et al. | 428/447 |
| 4,714,738 | 12/1987 | Chang et al. | 525/58 |
| 4,764,569 | 8/1988 | Umemoto et al. | 525/446 |
| 4,788,107 | 11/1988 | Chang et al. | 428/447 |
| 4,808,663 | 2/1989 | Chang et al. | 525/100 |
| 4,810,759 | 3/1989 | Ryntz | 525/440 |
| 4,826,904 | 5/1989 | Matsumura et al. | 524/314 |
| 4,870,140 | 9/1989 | Ryntz | 525/440 |
| 4,945,145 | 7/1990 | Bruylants et al. | 526/279 |
| 5,162,426 | 11/1992 | Hazan et al. | 524/521 |
| 5,182,174 | 1/1993 | Stephenson | 428/450 |
| B1 4,785,035 | 7/1990 | Palluel et al. | 524/101 |

*Primary Examiner*—Patrick Niland
*Attorney, Agent, or Firm*—Hilmar L. Fricke

[57] ABSTRACT

A coating composition containing film forming binder and a volatile liquid carrier for the binder; wherein the binder contains a. an acrylic polymer of polymerized monomers selected from the group consisting of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene and any mixtures thereof;

b. an acrylosilane polymer of polymerized monomers selected from the group consisting of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene and any mixtures thereof and an ethylenically unsaturated hydroxy functional acrylosilane monomer; and c. an organic polyisocyanate;

The clear coating has improved resistance to maring and to acid etching when exposed to natural weathering conditions.

8 Claims, No Drawings

COATING CONTAINING ACRYLOSILANE POLYMER TO IMPROVE MAR AND ACID ETCH RESISTANCE

BACKGROUND OF THE INVENTION

1. Field of the Invention

This invention is directed to coating compositions, in particular clear coating compositions used as over color coating of a motor vehicle that have improved mar and acid etch resistance by the addition of a silane containing acrylic polymer.

2. Description of the Prior Art

Acid rain an other air pollutants have caused problems of water spotting and acid etching of finishes used on automobiles and trucks. The finish of choice presently being used on the exterior of automobiles and trucks is a clear coat/color coat finish in which a clear coating is applied over a color coat which is pigmented to provide protection to the color coat and improve the appearance of the overall finish such as gloss and distinctness of image. Another problem is mar resistance of clear coat finishes. Maring of the finish can be caused by mechanical washing procedures used in a typical commercial car wash or by other mechanical marking of the finish. By introducing additives to improve acid etch resistance, resistance to mating of the finish often is reduced There is a need for an additive for clear coating compositions that will form finishes that are resistant to acid etching and water spotting caused by acid rain and will form finishes that are resistant to maring.

SUMMARY OF THE INVENTION

A coating composition containing 40–70% by weight of film forming binder and 30–60% by weight of a volatile liquid carrier for the binder; wherein the binder contains about a. 30–70% by weight, based on the weight of the binder, of an acrylic polymer of polymerized monomers selected from the group of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene or any mixtures of these monomers;

b. 5–30% by weight, based on the weight of the binder, of an additive of an acrylosilane polymer of polymerized monomers selected from the group of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene or any mixtures of these monomers and an ethylenically unsaturated hydroxy functional acrylosilane monomer; and c. 25–50% by weight, based on the weight of the binder of an organic polyisocyanate.

DETAILED DESCRIPTION OF THE INVENTION

The coating composition of this invention is general used as a clear coating composition that is applied over a base coat which is a pigmented composition. Clear coat/base coat finishes are conventionally used on the exterior of automobiles and trucks. The coating composition of this invention forms a clear finish, has improved acid etch resistance, water spot resistance and mar resistance.

In a typical body of a motor vehicle, such as an automobile or a truck, the substrate is steel or can be a plastic or a composite. If it is a steel substrate, it is first treated with an inorganic rust-proofing zinc or iron phosphate layer and then a primer is applied by electrocoating. Typically, these primers are epoxy modified resins crosslinked with a polyisocyanate and are applied by a cathodic electrocoating process. Optionally, a primer can be applied over the electrodeposited primer to provide for better appearance and/or improved adhesion of the basecoat to the primer. A pigmented basecoat or color coat then is applied. A typical basecoat comprises pigment which can include metallic flake pigments such as aluminum flake, and a film forming binder which can be a polyurethane, an acrylourethane, an acrylic polymer or an acrylosilane polymer, and contains a crosslinking agent such as an aminoplast, typically, an alkylated melamine formaldehyde crosslinking agent or a polyisocyanate. The basecoat can be solvent or water borne and can be in the form of a dispersion or a solution.

A clear top coat (clear coat) then is applied to the basecoat before the basecoat is fully cured and the basecoat and clear coat are then fully cured usually by baking at about 100°–150° C. for about 15–45 minutes. The basecoat and clear coat preferably have a dry coating thickness of about 2.5–75 microns and 25–100 microns, respectively.

In the event such a clear coat/basecoat finish is damaged, e.g., in a collision, a refinish basecoat is applied and then a clear coat is applied but baking generally is not used to cure the finish and the finish is cured at ambient temperatures or at slightly elevated temperatures, e.g., 35°–65° C.

The clear coat composition contains about 40–70% by weight of a film forming binder and about 30–70% of a volatile organic liquid carrier which usually is a solvent for the binder. The clear coat also can be in dispersion form. The film forming binder of the clear coat composition contains about 30–70% by weight of an acrylic polymer having reactive hydroxyl groups, 5–30% by weight of an acrylosilane polymer additive and 25–50% by weight of an organic polyisocyanate crosslinking agent.

Acrylosilane polymers which contain curable silane groups are used in the clear coating composition. These acrylosilane polymers are of polymerized monomers of alkyl methacrylates, alkyl acrylate, each having 1–12 carbon atoms in the alkyl groups, isobornyl methacrylate, isobornyl acrylate, hydroxy alkyl methacrylate, hydroxy alkyl acrylate each having 1–4 carbon atoms in the alkyl group, styrene or a any mixture of any of the above monomers and an ethylenically unsaturated hydroxy functional acrylosilane. These acrylosilane polymers have a weight average molecular weight of about 1,000–10,000.

All molecular weights disclosed herein are determined by gel permeation chromatography (GPC) using a polystyrene standard, unless otherwise noted.

One preferred acrylosilane polymer is the polymerization product of non silane containing monomers of an alkyl methacrylate, an alkyl acrylate each having 1–8 carbon atoms in the alkyl group, isobornyl methacrylate, styrene, hydroxy alkyl methacrylate having 1–4 carbon atoms in the alkyl group; and 5–40% by weight of an ethylenically unsaturated silane containing monomer.

Typically useful ethylenically unsaturated non-silane containing monomers are alkyl acrylates, alkyl methacrylates where the alkyl groups have 1–12 carbon atoms such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like; methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Isobornyl methacrylate and isobornyl acrylate also can be used. Mixtures of two or more of the above mentioned monomers are useful in formulating the polymer with the desired characteristics.

In addition to alkyl acrylates or methacrylates, other non-silane containing polymerizable monomers in amounts up to about 50% by weight of the polymer can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

Hydroxy functional monomers may be incorporated into the acrylosilane polymer to produce a polymer having a hydroxy number of 20 to 200. Typically useful hydroxy functional monomers are hydroxy alkyl methacrylates and acrylates such as hydroxy ethyl methacrylate, hydroxy propyl methacrylate, hydroxy butyl methacrylates, hydroxy isobutyl methacrylate, hydroxy ethyl acrylate, hydroxy propyl acrylate, hydroxy butyl acrylate, and the like.

A suitable silane containing monomer useful in forming an acrylosilane polymer is an alkoxysilane having the following structural formula:

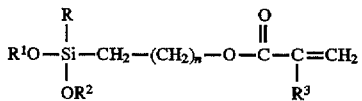

wherein R is either $CH_3$, $CH_3CH_2$, $CH_3O$, or $CH_3CH_2O$; $R^1$ and $R^2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylate alkoxy silanes, such as gammaacryloxypropyltrimethoxy silane and the methacrylatoalkoxy silanes, such as gamma-methacryloxypropyltrimethoxy silane, and gamma-methacryloxypropyltris(2-methoxyethoxy)silane.

Other suitable alkoxy silane monomers have the following structural formula:

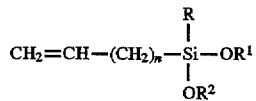

wherein R, $R^1$ and $R^2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy)silane.

Other useful silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Mixtures of the above-mentioned silane-containing monomers are also suitable.

Consistent with the above mentioned components of the acrylosilane polymer, the following is an example of an acrylosilane polymer useful in the coating composition of this invention that contains the following constituents: about 0–40% by weight styrene, 0–40% by weight methyl methacrylate, 10–40% by weight ethylhexyl acrylate, 0–40% by weight butyl acrylate, 0–40% by weight hydroxypropyl acrylate 0–40% by weight isobornyl methacrylate and 5–40% by weight gammamethacryloxypropyltrimethoxy silane.

Silane functional macromonomers also can be used in forming the acrylosilane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

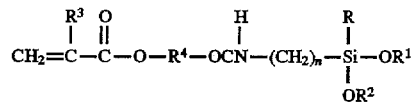

wherein R, $R^1$, $R^2$ and $R^3$ are as described above; $R^4$ an alkylene group having 1–8 carbon atoms and n is a positive integer from 1–8.

The acrylosilane polymer is prepared by a conventional solution polymerization process in which the monomers, solvents and polymerization catalyst are heated to about 120°–160° C. for about 2–4 hours to form the polymers.

Typical polymerization catalysts are azo type catalysts such as azo-bis-isobutyronitrile, acetate catalysts such as t-butyl peracetate, di-t-butyl peroxide, t-butyl perbenzoate, t-butyl peroctoate and the like.

Typical solvents that can be used are ketones such as methyl amyl ketone, isobutyl ketone, methyl ethyl ketone, aromatic hydrocarbons such as toluene, xylene, ethers, esters, alcohols, acetates and mixtures of any of the above.

Acrylic polymers are used in the clear coating composition are of polymerized monomers of alkyl methacrylates, alkyl acrylates, each having 1–12 carbon atoms in the alkyl groups, isobornyl methacrylate, isobornyl acrylate, hydroxy alkyl methacrylate, hydroxy alkyl acrylate each having 1–4 carbon atoms in the alkyl group, styrene or any mixture of any of the above monomers. These acrylic polymers have a weight average molecular weight of about 1,000–10,000.

Any of the aforementioned alkyl methacrylates, alkyl acrylates, hydroxy alkyl methacrylates and acrylates and other non silane containing monomers mentioned above can be used to form the acrylic polymer.

One particularly useful acrylic polymer is formed of polymerized monomers of butyl acrylate, isobornyl methacrylate, hydroxy ethyl methacrylate, methyl methacrylate, isobutyl methacrylate and styrene and has a number average molecular weight of about 2,000–4,000.

The coating composition can contain from about 1–20% by weight of a polyester resin which is the esterification product of an aliphatic dicarboxylic acid, a polyol having at least three reactive hydroxyl groups, a diol, a cyclic anhydride and a cyclic alcohol. One preferred polyester is the esterification product of adipic acid, trimethylol propane, hexanediol, hexahydrophathalic anhydride and cyclohexane dimethalol.

The coating composition also contains an organic polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-bisphenylene diisocyanate, toluene diisocyanate, bis cyclohexyl diisocyanate, tetramethylene xylene diisocyanate, ethyl ehtylene diisocyanate, 2,3-dimethyl ethylene diisocyanate, 1-methyltrimethylene diisocyanate, 1,3-cyclopentylene diisocyante, 1,4-cyclohexylene diisocyanate, 1,3-phenylene diisocyanate, 1,5-naphthalene diisocyanate, bis-(4-isocyanatocyclohexyl) -methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Isocyanurates can be used such as the isocyanurate of isophorone diisocyanate.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160.

One preferred polyisocyanate crosslinking agent is a mixture of the trimer of hexamethylene diisocyanate and the isocyanurate of isophorone diisocyanate.

Curing catalysts, generally are used in the coating composition in amounts of about 0.01–2% by weight, based on the weight of the binder, for catalyzing the crosslinking between silane moieties of the acrylosilane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium thelate, and other such catalysts or mixtures thereof known to those skilled in the art. Tertiary amines and acids or combinations thereof are also useful for catalyzing silane bonding. Other silane curing catalysts are disclosed in U.S. Pat. No. 4,923, 945, column 15 to column 17, herein incorporated by reference.

To improve the weatherability of the clear coat, ultraviolet light stabilizers or a combination of ultraviolet light stabilizers can be added to the clear coat composition in the amount of about 0.1–10% by weight, based on the weight of the binder. Such stabilizers include ultraviolet light absorbers, screeners, quenchers, and specified hindered amine light stabilizers. Also, an antioxidant can be added, in the amount 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of "Tinuvin" 900 (UV screener) and "Tinuvin" 123 (hindered amine), both commercially available from Ciba-Geigy, is preferred.

The clear coating composition may also include other conventional formulation additives such as flow control agents, for example, such as Resiflow™ S (polybutylacrylate), BYK™ 320 and 325 (high molecular weight polyacrylates); and rheology control agents, such as fumed silica.

Conventional solvents and diluents are used to disperse an/or dilute the above mentioned polymers of the clear coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic aromatic hydrocarbons, esters, ethers and ketones and the like.

Typical basecoats used in combination with the clear coating composition, comprise as the film forming binder a polyurethane, an acrylourethane, an acrylosilane, an acyclic resin and a crosslinking agent such as a polyisocyanate or an alkylated melamine resin. The basecoat can be waterborne or solvent based solution or dispersion. The basecoat contains pigments such as are conventionally used including metallic flake pigments such as aluminum flake.

Both the basecoat and the clear coat are applied by conventional techniques such as spraying, electrostatic spraying, dipping, brushing, flow coating and the like.

The following examples illustrate the invention. All parts and percentages are on a weight basis unless otherwise indicated. Molecular weights are determine by GPC (Gel Permeation Chromatography) using polymethyl methacrylate as the standard.

EXAMPLE 1

The following polymers and resins were prepared and used in the Example.

Acrylosilane Polymer A

The following constituents were charged into a reactor equipped with a stirrer, nitrogen purge, condenser and thermometer:

|  | PARTS BY WEIGHT |
|---|---|
| Portion 1 | |
| Xylene | 617.5 |
| Toluene | 378.4 |
| Portion 2 | |
| Styrene momomer (S) | 363.6 |
| Methyl methacrylate monomer (MMA) | 352.1 |
| Isobornyl methacrylate monomer (IBMA) | 352.1 |
| Butyl acrylate monomer (BA) | 163.6 |
| Ethylhexyl acrylate monomer (EHA) | 163.6 |
| Hydroxy propyl acrylate monomer (HPA) | 181.8 |
| Gamma - methacryloxypropyl trimethoxy silane monomer (TPM) | 240.5 |
| Polymerization initiator - 2,2 (2-methyl butane nitrile) | 90.3 |
| Portion 3 | |
| Polymerization intiator - described above | 5.4 |
| Xylene | 56.4 |
| Toluene | 34.5 |
| Trimethylortho formate | 30.0 |
| Total | 3029.8 |

Portion 1 was charged into the reactor and heated to its reflux temperature. Portion 2 was premixed and added at a uniform rate to the reactor over a 240 minute period while maintaining the reaction mixture at its reflux temperature. Portion 3 was premixed and added to the reactor over a 30 minute period after Portion 2 was added. The reaction mixture was held for 30 minutes at 130° C. and then cooled. The resulting polymer solution had a polymer solids content of about 62.6% and the polymer had a composition of S/MMA/IBMA/BA/EHA/HPA/TPM of 20/19.4/19.4/9/9/10/13.2 and a Gardner Holdt viscosity of U and a weight average molecular weight of about 8,000.

Styrene Acrylic Polymer B

A styrene acrylic polymer solution was prepared using a similar polymerization procedure as described above. The polymer had the following composition: n-butyl acrylate/isobornyl methacrylate/2-hydroxyethyl methacrylate/methyl methacrylate/isobutyl methacrylate/styrene in a ratio of 20.5/30.5/25/2/2/20 and having a number average molecular weight of about 3,000 and a Tg (glass transition temperature) of about +35° C. and the polymer solution had a solids content of about +65% by weight.

Polyester C

The following polyester polymer solution was prepared using conventional polymerization procedures: adipic acid/trimethylol propane/1,6 hexane diol/hexahydrophthalic anhydride/1,4-cyclohexane dimethalol in a weight ratio of 21.5/6.2/20.7/26.3/25.3 having a number average molecular weight of about 1500 and a Tg of about −45° C. and the polymer solution had a solids content of about 80% by weight.

Two coating compositions were formulated by blending together the following ingredients:

|  | Parts by Weight | |
|---|---|---|
|  | Invention | Control |
| Portion 1 |  |  |
| Styrene acrylic polymer B solution (described above) | 34.65 | 45.35 |
| Polyester C solution | 10.00 | 10.00 |
| "Tinuvin" 292 - bis (N-methyl-2,2,6,6-tetramethyl piperidinyl) sebacate | 0.80 | 0.80 |
| "Tinuvin" 328 - 2-(2hydroxy-3,5-ditertiary amyl phenol)-2H-benzotriazole | 0.80 | 0.80 |
| BYK 306 - Anti crater agent of a polyether modified dimethyl polysiloxane copolymer in xylene/monophenyl gylcol 7:2 ration | 0.30 | 0.30 |
| Dibutyl tin dilaurate | 0.02 | 0.02 |
| DABCO catalyst - 1,4-diazabicyclo [2.2.2] octane | 0.13 | 0.13 |
| Acrylosilane Polymer A solution (prepared above) | 12.50 | 0.00 |
| Butyl acetate | 7.10 | 7.00 |
| Xylene | 7.10 | 7.00 |
| Methyl ethyl ketone | 3.00 | 3.00 |
| Portion 2 |  |  |
| "Desmodur" 3390 (trimer of hexamethylene diisocyanate) | 10.30 | 11.30 |
| IPDI-T1890E (isocyanurate of isophorone diisocyanate) | 10.30 | 11.30 |
| Total | 100.00 | 100.00 |

Portion 1 was charged into a mixing vessel and mixed and then Portion 2 was added and mixed to form the coating compositions.

Each of the coating compositions were drawn down by a rod on separate glass panel to form a 2 mil thick film and the Tukon hardness was determined after the films had completely dried after 1 and 4 days. For the swelling test 2 mils of each of the coating compositions was drawn down on separate panels of TPO (thermoplastic polyolefin) and swelling in methylene chloride was determined after 1 and 4 days. For the flexibility test, 2 mils of each of the above coating composition was drawn down on separate panels of RIM (reaction injection molded panel) and flexibility determined after 1 and 4 days. Mar and spot free temperature was determined on separate phospahtized cathodic electrocoated steel panels each coated with 1 mil of a black acrylic base coating composition and then each coated with 2 mils of the above prepared coating composition of the invention and the control composition. The mar test was done after 14 days of drying at room temperature and the spot free temperature test was done on similarly prepared panels.

The following is a summary of the physical properties of the coating determined by the above test:

|  | Parts by Weight | |
|---|---|---|
| Properties | Invention | Control |
| Wet mar resistance | 44.0 | 32.0 |
| Tukon Hardness (knoops) |  |  |
| 1 Day curing time | 3.3 | 1.8 |
| 4 Days curing time | 6.7 | 5.5 |
| Dry to touch (minutes) | 3.5 | 3.0 |
| Swelling in methylene chloride |  |  |
| 1 Day | 1.79 | 1.76 |
| 4 Days | 1.70 | 1.64 |
| Flexibility |  |  |
| 1 Day | Very Good | Very Good |
| 4 Days | Very Good | Very Good |
| Zahn #2 Visosity (seconds) | 16.4 | 15.6 |
| Spot Free Temperature (°C.) | 55 | 40 |

The spot free temperature test is run by exposing the coating to an aqueous 10% sulfuric acid solution and measuring the temperature at which etching occurs. The higher the temperature the better the etch resistance of the coating.

The above test results show an improvement in both mar resistance and etch resistance of the coating composition of the invention formulated with the acrylic silane polymer A incomparison to the control which did not contain the acrylic silane polymer.

We claim:

1. A coating composition comprising 40–70% by weight of film forming binder and 30–60% by weight of a volatile liquid carrier for the binder; wherein the binder comprises about a. 30–70% by weight, based on the weight of the binder, of an acrylic polymer consisting essentially of polymerized monomers selected from the group consisting of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene and any mixtures thereof;

b. 5–30% by weight, based on the weight of the binder, of an acrylosilane polymer consisting essentially of polymerized monomers selected from the group consisting of an alkyl methacrylate, an alkyl acrylate, each having 1–12 carbon atoms in the alkyl group, isobornyl methacrylate, isobornyl acrylate, hydroxy alkyl methacrylate, hydroxy alkyl acrylate each having 1–4 carbon atoms in the alkyl group, styrene and any mixtures thereof and an ethylenically unsaturated hydroxy functional acrylosilane monomer; and c. 25–50% by weight, based on the weight of the binder of an organic polyisocyanate comprising a mixture of the trimer of hexamethylene diisocyanate and the isocyanurate of isophorone diisocyanate.

2. The coating composition of claim 1 in which the acrylosilane polymer consists essentially of polymerized monomers of an alkyl methacrylate, an alkyl acrylate, each having 1–12 carbon atoms in the alkyl group, isobornyl methacrylate, styrene, hydroxy alkyl methacrylate having 1–4 carbon atoms in the alkyl group and a silane containing monomer having the following structural formula:

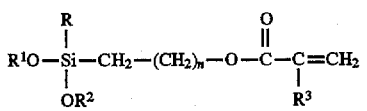

wherein:

R is selected from the group consisting of $CH_3$, $CH_3CH_2$, $CH_3O$, or $CH_3CH_2O$;

$R^1$ and $R^2$ are individually selected from the group consisting of $CH_3$, or $CH_3CH_2$; and $R^3$ is selected from the group consisting of H, $CH_3$, or $CH_3CH_2$ and n is 0 or a positive integer of 1–10.

3. The coating composition of claim 2 in which the silane is selected from the group consisting of gamma trimethoxy silyl propyl methacrylate and gamma trimethxoy silyl propyl acrylate.

4. The coating composition of claim 1 containing about 1–20% by weight, based on the weight of the binder, of a polyester resin consisting essentially of the esterification product of an aliphatic dicarboxylic acid, a polyol having at least three reactive hydroxyl groups, a diol, a cyclic anhydride, and a cyclic alcohol.

5. The coating composition of claim 4 in which the polyester resin is the esterification product of adipic acid, trimethylol propane, hexanediol, hexahydrophthalic anhydride and cyclohexane dimethalol.

6. The coating composition of claim 1 which contains about 1–10% by weight of ultraviolet light absorbers.

7. The coating composition of claim 1 in which the binder consists essentially of about a. 25–50% by weight, based on the weight of the binder, of acrylic polymer consisting essentially of polymerized monomers of an alkyl methacrylate, an alkyl acrylate, each having 1–4 carbon atoms in the alkyl group, isobornyl methacrylate, hydroxy alkyl methacrylate, having 1–4 carbon atoms in the alkyl group and styrene and having a number average molecular weight of about 1,000–3,000;

b. 5–20% by weight, based on the weight of the binder, of acrylosilane polymer consisting essentially of polymerized monomers of an alkyl methacrylate, an alkyl acrylate, each having 1–8 carbon atoms in the alkyl group, isobornyl methacrylate, styrene, hydroxy alkyl methacrylate having 1–4 carbon atoms in the alkyl group and a silane containing monomer of gamma trimethoxy silyl propyl methacrylate or gamma trimethoxy silyl propyl acrylate and having a number average molecular weight of about 1,000–10,000;

c. 0–20% by weight, based on the weight of the binder, of polyester resin consisting essentially of the esterification product of an aliphatic dicarboxylic acid, a polyol having at least three reactive hydroxyl groups, a diol, a cyclic anhydride, and a cyclic alcohol and having a number average molecular weight of about 500–4000; and d. 25–50% by weight, based on the weight of the binder, of organic polyisocyanate consisting essentially of a mixture of the trimer of hexamethylene diisocyanate and the isocyanurate of isophorone diisocyanate.

8. A substrate coated with a pigmented base coat and topcoated with a layer of the coating composition of claim 1.

* * * * *